United States Patent [19]
Hartley et al.

[11] Patent Number: 6,056,873
[45] Date of Patent: May 2, 2000

[54] MANAGEMENT OF A BODY OF WATER

[76] Inventors: Quentin John Seaton Hartley, 8 Marsbrook Road, Constantia Hills, Constantia 7800, Western Cape; Nicholas Johannes Grobler Smit, 40 Bordeaux Avenue, Everglen,. Durbanville 7550, Western Cape, both of South Africa

[21] Appl. No.: 09/050,451

[22] Filed: Mar. 30, 1998

[51] Int. Cl.[7] .......................... B01D 21/30; A01K 63/04
[52] U.S. Cl. .......................... 210/90; 210/108; 210/143; 210/169; 210/170; 210/278; 210/424; 119/226; 137/624.18; 137/625.11; 137/625.12
[58] Field of Search .......................... 210/90, 108, 130, 210/169, 170, 275, 278, 277, 416.2, 418, 739, 741, 424, 143; 119/226, 259, 260, 227; 137/563, 624.18, 625.11, 625.28, 625.12

[56] References Cited

U.S. PATENT DOCUMENTS

| | | |
|---|---|---|
| 3,785,391 | 1/1974 | Miller . |
| 3,791,768 | 2/1974 | Wanner . |
| 3,954,621 | 5/1976 | Etani et al. . |
| 4,109,670 | 8/1978 | Slagel . |
| 4,153,552 | 5/1979 | Muther . |
| 4,402,760 | 9/1983 | Strong . |
| 4,417,599 | 11/1983 | Kenny . |
| 4,456,216 | 6/1984 | Boruta . |
| 4,924,905 | 5/1990 | Mastromatteo . |
| 5,024,766 | 6/1991 | Mahmud . |
| 5,185,084 | 2/1993 | Lapidus et al. . |
| 5,217,607 | 6/1993 | Dalton, III et al. . |
| 5,266,495 | 11/1993 | Lapidus . |
| 5,401,395 | 3/1995 | Hagqvist et al. . |
| 5,505,844 | 4/1996 | Porter . |
| 5,520,215 | 5/1996 | Haboush . |

OTHER PUBLICATIONS

Vigilant, Technology for Measuring and Regulating Swimming Pool Water.

*Primary Examiner*—David A. Simmons
*Assistant Examiner*—Fred Prince
*Attorney, Agent, or Firm*—Ladas & Perry

[57] ABSTRACT

The installation disclosed comprises a body of water, a pump, a filter and pipes connecting the body of water, pump and filter. Additional pipes lead from the pipe to the return pipe and to waste. Solenoid operated valves are provided in the pipes so that flow through these pipes can be permitted or prevented depending on whether the valves are open or closed. A pressure sensor detects pressure at the inlet of the filter. A programmable controller controls operation of the valves all of which can be operated independently of the others. The body of water will normally be a swimming pool but could be a tank in which aquatic creatures are grown.

9 Claims, 3 Drawing Sheets

MANAGEMENT OF A BODY OF WATER

FIELD OF THE INVENTION

This invention relates to the management of a body of water.

BACKGROUND TO THE INVENTION

Conventional swimming pool installations comprise a filter and a pump. The vast majority of filters currently in use are sand filters. However, some diatomaceous earth and other filters are in use. A sand filter conventionally comprises a casing having a water inlet at the top and a water outlet at the bottom. The pump withdraws water from a skimmer box forming part of the pool, forces it through a pressure pipe leading to the top of the filter, through the sand in the filter from the top to the bottom and then feeds the water emerging from the filter outlet back to the pool along a return pipe.

When the filter becomes blocked, two valves of the installation are closed and two others are opened. This is usually done manually and has the effect of directing the water emerging from the pump to the bottom of the filter instead of the top. Water flowing upwardly through the sand in the filter in the opposite direction to normal agitates the sand and dislodges dirt particles. The dirt is carried away by the water to a waste pipe.

It is known to interconnect the valves so that they operate in unison. Thus a valve in the waste pipe opens and closes simultaneously with a valve in a pipe joining said pressure and return pipes, and valves in the pressure and return pipes also open and close simultaneously to enable backwashing to take place.

All filters block over a period of time and hence all have to be backwashed to clean them and restore full flow.

Other bodies of water confined in tanks exhibit similar problems to those encountered with swimming pools. For example, tanks in which shellfish such as abalone are cultivated foul and have to be cleaned in the same way that a swimming pool does.

BRIEF DESCRIPTION OF THE INVENTION

According to one aspect of the present invention there is provided an installation comprising a pump for withdrawing water from a body of water, a filter for removing dirt from the water, a first flow path leading from the pressure side of the pump to the inlet of the filter, a second flow path leading from the outlet of the filter to the body of water, a third flow path connecting said first and second flow paths, a fourth flow path constituting a waste outlet and communicating with the first flow path, and first, second, third and fourth valves in the first, second, third and fourth flow paths respectively for selectively opening and closing the first, second, third and fourth flow paths, each valve being operable independently of each other valve.

The installation preferably includes means for controlling the valves so that in one condition the first and second valves are open and the third and fourth valves are closed, and in a further condition the first and second valves are closed and the third and fourth valves are open. To provide for automatic backwashing, a pressure sensor can be provided for detecting the pressure at the inlet to the filter, and there can be controlling means for changing said valves from said one condition to said further condition upon the detected pressure at the filter inlet reaching a predetermined value.

The means for controlling the valves can so control the valves that the first and fourth valves are open when the second and third valves are shut whereby water can be pumped directly to waste through the first and fourth pipes.

According to a further aspect of the present invention there is provided a unit for connection into pipe work connected to a body of water, the unit comprising a first pipe including an inlet for connection to the pressure side of a pump and an outlet for connection to the inlet of a filter, a first valve in said first pipe, a second pipe having an inlet for connection to the outlet of a filter and an outlet for connection to the body of water, a second valve in said second pipe, a third pipe connecting the first pipe between its inlet and said first valve to the second pipe between its inlet and the second valve, a third valve in said third pipe, a fourth pipe connected to the first pipe between its outlet and the first valve, the fourth pipe having an outlet for connection to waste and there being a fourth valve in said fourth pipe, the first to fourth valves being independently operable to open and close said first to fourth pipes respectively.

The unit can include a programmable controller for operating said valves.

To make automatic backwashing possible, there can be a pressure sensor between said outlet of the first pipe and the connection between the first and fourth pipes.

In the preferred form said unit includes a first manifold and a second manifold, said first inlet being constituted by one end of the first manifold and the outlet for connection to waste being constituted by the other end of the first manifold, the first manifold leading from said inlet for connection to a pump to the first valve, from the first valve to the fourth valve and from the fourth valve to said outlet for connection to waste, said outlet for connection to the inlet of a filter branching-off the first manifold between the first and fourth valves, and the second manifold branching-off the first manifold between said inlet for connection to a pump and said first valve, said second manifold leading from the first manifold to the third valve, from the third valve to the second valve, and from the second valve to said outlet for connection to the body of water, the inlet for connection to the outlet of a filter branching-off the second manifold between the second and third valves.

According to another aspect of the present invention there is provided a unit for connection into pipe work connected to a body of water, the unit comprising a manifold having an inlet for connection to the pressure side of a pump, the inlet communicating with first and second inlet chambers of the manifold which are bounded by first and second peripheral walls each having an upper edge, a first outlet for connection to the body of water so that water can flow from the manifold to the body of water, a second outlet for connection to a drain so that water can flow from the manifold to waste, said outlets respectively communicating with first and second outlet chambers which are respectively bounded by third and fourth peripheral walls each having an upper edge, first and second ports which serve both as inlets and outlets and are respectively for connection to the inlet of a filter and to the outlet of a filter, said first port communicating with two chambers, one of these chambers being bounded by said first peripheral wall and the other of these chambers by said fourth peripheral wall, there being an additional chamber bounded by said second and third peripheral walls, said second port communicating with this additional chamber.

The invention also provides the combination of a manifold defined in the preceding paragraph and a cover, there being a diaphragm between the cover and the manifold, said diaphragm bearing on said peripheral walls to form four valves, each of said first and second inlet chambers, said other chamber and said additional chamber being connected by bleed passages passing through the diaphragm to respective compartments above the diaphragm, there being an outlet passage from each compartment and valve means in each outlet passage for allowing flow from each compartment thereby to drop the pressure therein when the respective valve means is open, and means for controlling said valve means independently of one another.

BRIEF DESCRIPTION OF THE DRAWINGS

For a better understanding of the present invention, and to show how the same may be carried into effect, reference will now be made, by way of example, to the accompanying drawings in which.

DETAILED DESCRIPTION OF THE DRAWINGS

Figure 1:
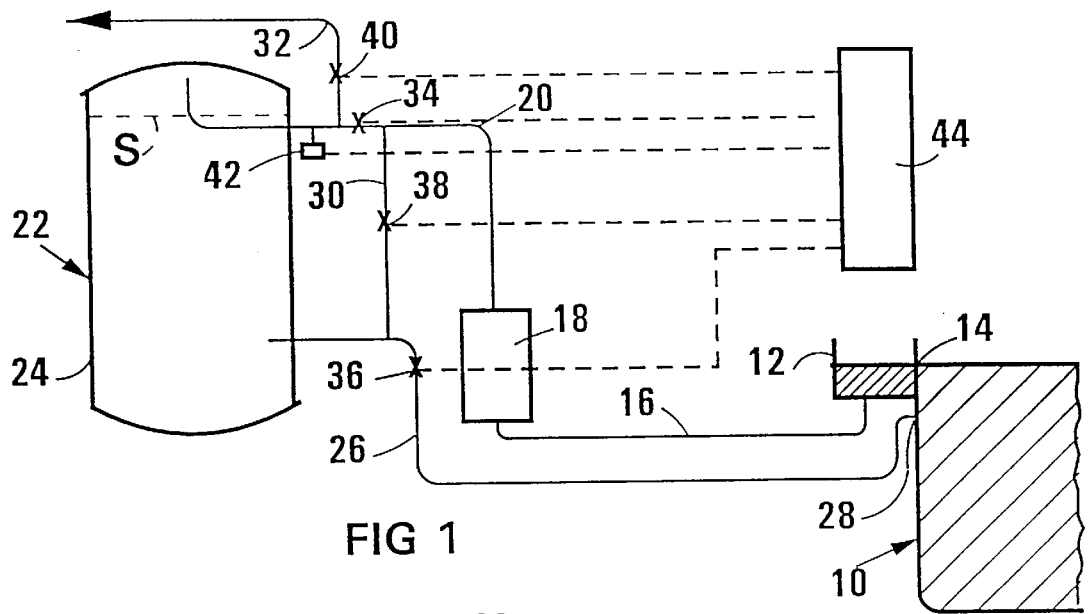
FIG. 1 diagrammatically illustrates a swimming pool and associated pipe work including a water flow control system.

In FIG. 1 reference numeral 10 designates a swimming pool to one side of which there is a skimmer box 12 and a weir 14 forming the connection between the skimmer box 12 and the swimming pool 10. An outflow pipe 16 leads from the skimmer box 12 to a pool pump 18. The pressure side of the pump 18 is connected by a pipe 20 to a sand filter 22. The filter 22 comprises a casing 24 which is partly filled with sand designated S. The pipe 20 enters the casing 24 below the level of the sand S, the pipe bending upwardly to spray water into the space above the sand.

An outlet pipe from the filter is designated 26, this leading from a position close to the lower end of the casing 24 to an inlet 28 in the wall of the swimming pool 10.

The pipes 20 and 26 are connected by a further pipe 30 and a waste pipe 32 is connected to the pipe 20 between its connection to the pipe 30 and the filter 22. Electrically operated valves 34, 36, 38 and 40 are provided in the pipes 20, 26, 30 and 32 respectively. Each valve includes a solenoid for opening and shutting it and is connected to a source of electrical power. In addition each valve has an electrical input point to which control signals are applied. Depending on the nature of the control signal, the solenoid is energised or de-energised to open or close the valve.

A pressure sensor 42 is provided between the valve 34 and the filter 22. The pressure sensor 42 senses the pressure at the inlet of the filter and produces an electrical signal indicative of back pressure. A programmable controller 44 is connected to the pressure sensor 42 and to the input points of the valves 34, 36, 38, 40.

During normal operation of the pool, the valves 34 and 36 are open and the valves 38 and 40 are closed. Water is thus drawn by the pump 18 from the skimmer box 12 and fed to the filter 22. The water percolates down through the sand S in the casing 24 and dirt particles in the water are retained by the sand. Filtered water emerges from the casing 24, enters the pipe 26 and is returned to the pool via the inlet 28.

As dirt accumulates in the filter 22, the back pressure detected by the pressure sensor 42 increases. The controller 44 is programmed so that upon the pressure detected by the sensor 42 reaching a predetermined magnitude, a backwash program is initiated. Previously open valves 34 and 36 are closed and previously closed valves 38 and 40 are opened. The pump 18 thus feeds water under pressure into the pipe 30, along a portion of the pipe 26 and into the lower end of the filter casing 24. Water flowing upwardly in the casing agitates the sand and carries the dirt that has been retained in the sand towards the inlet of the filter. The dirt, entrained in the flowing water, flows into the pipe 20 and is diverted by the closed valve 34 into the waste pipe 32 through the open valve 40.

Backwashing continues for a predetermined period of time which can be adjusted by the pool owner. At the end of the predetermined period, the valves 38 and 40 close and the valves 34 and 36 open so that the normal filtering cycle recommences. In the event that the pressure sensor 42 is still detecting a pressure above the predetermined threshold level, the backwashing cycle is repeated.

If it is desired to pump some of the water in the swimming pool 10 to waste, the valves 34 and 40 are opened and the valves 38 and 36 are closed. The pump 18 thus pumps water through the open valves 34 and 40. No flow through the filter 22 or back to the pool 10 is possible because the valves 36 and 38 are closed.

Figure 2:
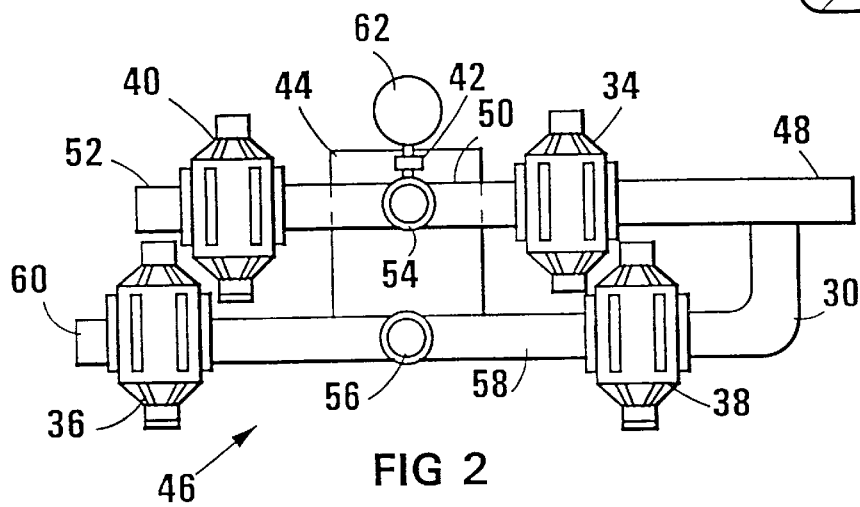
FIG. 2 is a side elevation of a unit for controlling flow of swimming pool water through a filter and to waste.
Figure 3:
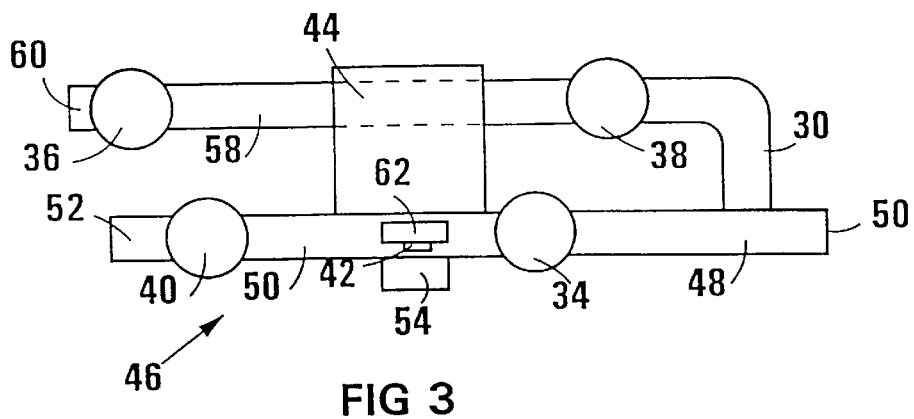
FIG. 3 is a top plan view of the structure of FIG. 2.

FIGS. 2 and 3 illustrate a unit 46 which can be connected into the pipe work of the pool immediately adjacent the pool pump 18 and filter 22. The unit 46 includes a first pipe length 48 which terminates at its right hand end in a coupling forming an inlet for connection to the pump 18. The pipe 30 branches off the pipe length 48 and is connected to the valve 38. A pipe length 50 connects the valve 34 to the valve 40. Beyond the valve 40 there is a pipe length 52 which terminates in a pipe coupling forming an outlet for connection to the pipe 32. A pipe coupling 54 is provided which branches-off the pipe length 50 for connecting the unit 46 to the top inlet of the filter 22.

A further pipe coupling 56 leads-off a pipe length 58 which connects the valves 36 and 38, the coupling 56 connecting the unit 46 to the bottom outlet of the filter 22. A pipe length 60 beyond the valve 36 terminates in a pipe coupling for connection to the pipe 26.

The pressure sensor 42 is connected at the junction between the coupling 54 and the pipe length 50. A pressure gauge 62 is also provided at this point.

The controller 44 is mounted on the pipe length 50 and tied to the pipe length 58 between the valves 34 and 38 which are on one side of it and the valves 36 and 40 which are on the other side of it.

The unit 46 thus includes a first manifold and a second manifold. The first manifold comprises the pipe lengths 48, 50 and 52. The second manifold comprises the pipe 30 and the pipe lengths 58 and 60. The inlet for connection to the pipe 20 is constituted by one end of the first manifold and the outlet for connection to the waste pipe 32 is constituted by the other end of the first manifold. The first manifold thus leads from the pressure inlet to the valve 34, from the valve 34 to the valve 40 and from the valve 40 to the waste outlet. The outlet for connection to the inlet of the filter branches-off the first manifold between the valves 34 and 40. The second manifold branches-off the first manifold between the pressure inlet and the valve 34, the second manifold leading from the first manifold to the valve 38, from the valve 38 to the valve 36, and from the valve 36 to the outlet for connection to the pool. The inlet for connection to the outlet of the filter branches-off the second manifold between the valves 38 and 36.

If it is desired to circulate water from the swimming pool 10 back to the swimming pool, bypassing the filter 22, the valves 36 and 38 are opened and the valves 34 and 40 are closed. The pump thus pumps water through the open valves 36 and 38. No flow through the filter 22 or to waste is possible because valves 34 and 40 are closed. Such circulation can be required, for example, to mix chemicals applied to the pool so that they are evenly distributed through the water in the pool.

Figure 4:
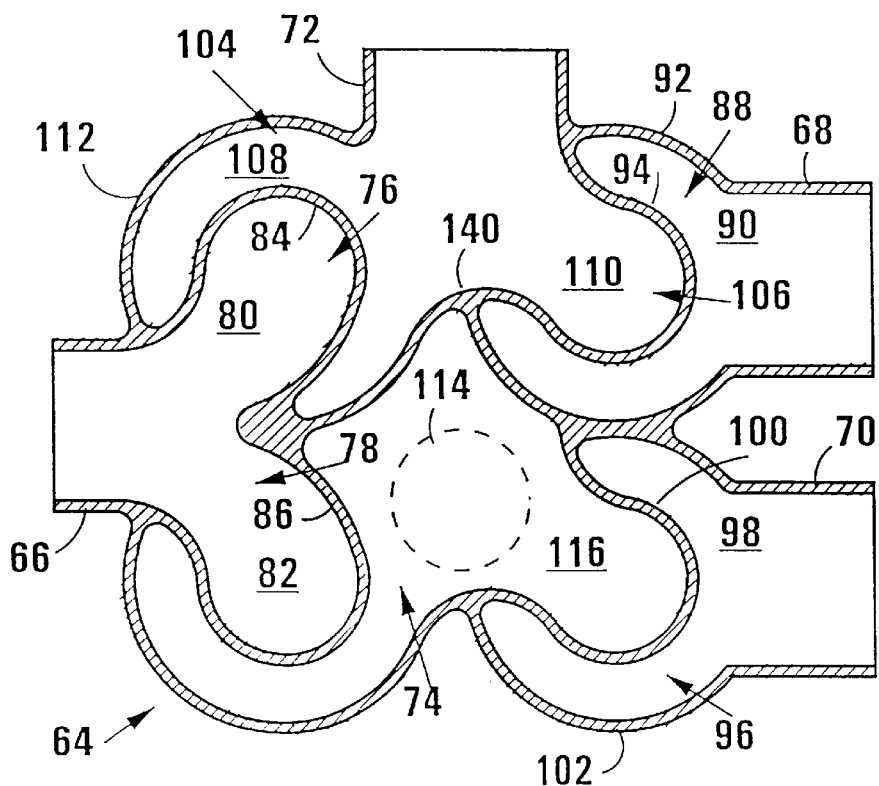
FIG. 4 is a diagrammatic horizontal section through a manifold.

The manifold 64 shown in FIG. 4 is injection moulded in synthetic plastics material and comprises four pipes 66, 68, 70 and 72. The pipes 66, 68, 70 and 72 include couplings (not shown) for enabling them to be connected to piping which leads respectively to the outlet from the pump, to waste, to the pool, and to the upper end of the filter. The return connection from the filter leads into the chamber designated 74.

The pipe 66 communicates with two chambers 76, 78 which are closed at their lower ends by base walls 80, 82 and around their peripheries by part circular walls 84, 86. The chambers 76 and 78 are open at their upper ends.

The pipe 68 communicates with a chamber 88 which is closed at its lower end by a base wall 90 and bounded around its outer and inner peripheries by part-circular walls 92 and 94. The chamber 88 is open at its upper end.

The pipe 70 communicates with a chamber 96 which is closed at its lower end by a base wall 98 and bounded around its outer and inner peripheries by part-circular walls 100 and 102. The chamber 96 is open at its upper end.

The pipe 72 communicates with two chambers 104 and 106. The chamber 104 is closed at its lower end by a base wall 108 and around its inner periphery by the wall 84. The chamber 106 is closed at its lower end by a base wall 110 and around its outer periphery by the wall 94. The chamber 104 is bounded around its outer periphery by a part circular wall 112. Both chambers 104 and 106 are open at their upper ends.

A further pipe 114 leads into the chamber 74 through the base wall 116 of that chamber. The pipe 114 connects to the outlet of the filter.

It will be understood that the base walls of the various chambers constitute a common bottom of the moulding.

Figure 5:
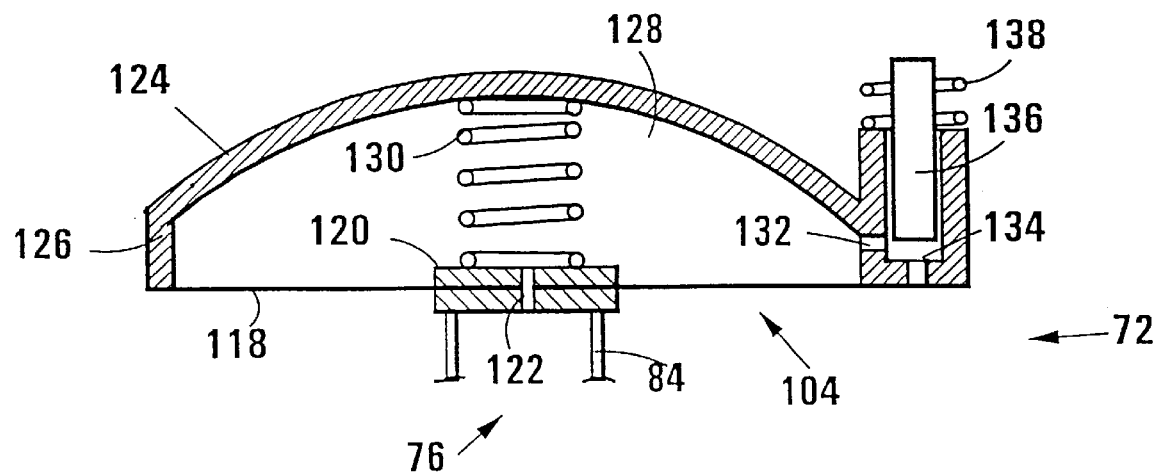
FIG. 5 is a vertical section showing part of a cover and a valve.

A diaphragm 118 (FIG. 5) seats on the upper edges of the bounding walls of the manifold 64 and closes the upper ends of the chambers 74, 76, 78, 88, 96, 104 and 106. More specifically, there are four disc-like valve closure members 120 forming part of the diaphragm 118. Each valve closure member 120 has a bleed passage 122 through it. For the sake of illustration part of the wall 84 and parts of the chambers 76 and 104 are shown in FIG. 5. A dome 124 having a rim 126 defines a compartment 128 between itself and the diaphragm 118. The passage 122 connects the chamber 76 to the compartment 128. A spring 130 located between the dome 124 and the m ember 120 holds the member 120 against the top edge of the wall 8 4.

Within a thicker part of the wall of the dome 124 there is a bleed passage 132 which leads from the compartment 128 to the pipe 72. The passage 132 includes a seat 134 and a plunger 136 is normally pressed against the seat 134 by a spring loaded solenoid 138. When the solenoid 138 is energised, it retracts the plunger 136 and opens the passage 132. The solenoid 138 is connected to the programmable controller.

The passage 132 permits a greater flow rate than the passage 122. Hence, when the passage 132 is opened, the compartment 128 empties, the pressure in the chamber 76 lift s the diaphragm 118 and flow from the chamber 76 over the upper edge of the wall 84 to the chamber 104 commences.

The dome 124 is part of a cover for the manifold 64, the cover including four domes 124. The rims of the domes hold the diaphragm against the underlying upper edges of the walls of the manifold thereby to seal around the periphery of the manifold and along the internal wall 140 (FIG. 5) between the chamber 74 on the one hand and the chambers 104,106 on the other hand and between which no flow is ever required.

Protruding lugs (not shown) on the manifold 64 and cover receive nuts and bolts, or other fastening means, for securing the cover to the manifold.

The four valves constituted by the four members 120 can be closed and opened independently of one another to achieve the four flow configurations described above, by operating the solenoids 138 using the programmable controller.

Figure 6:
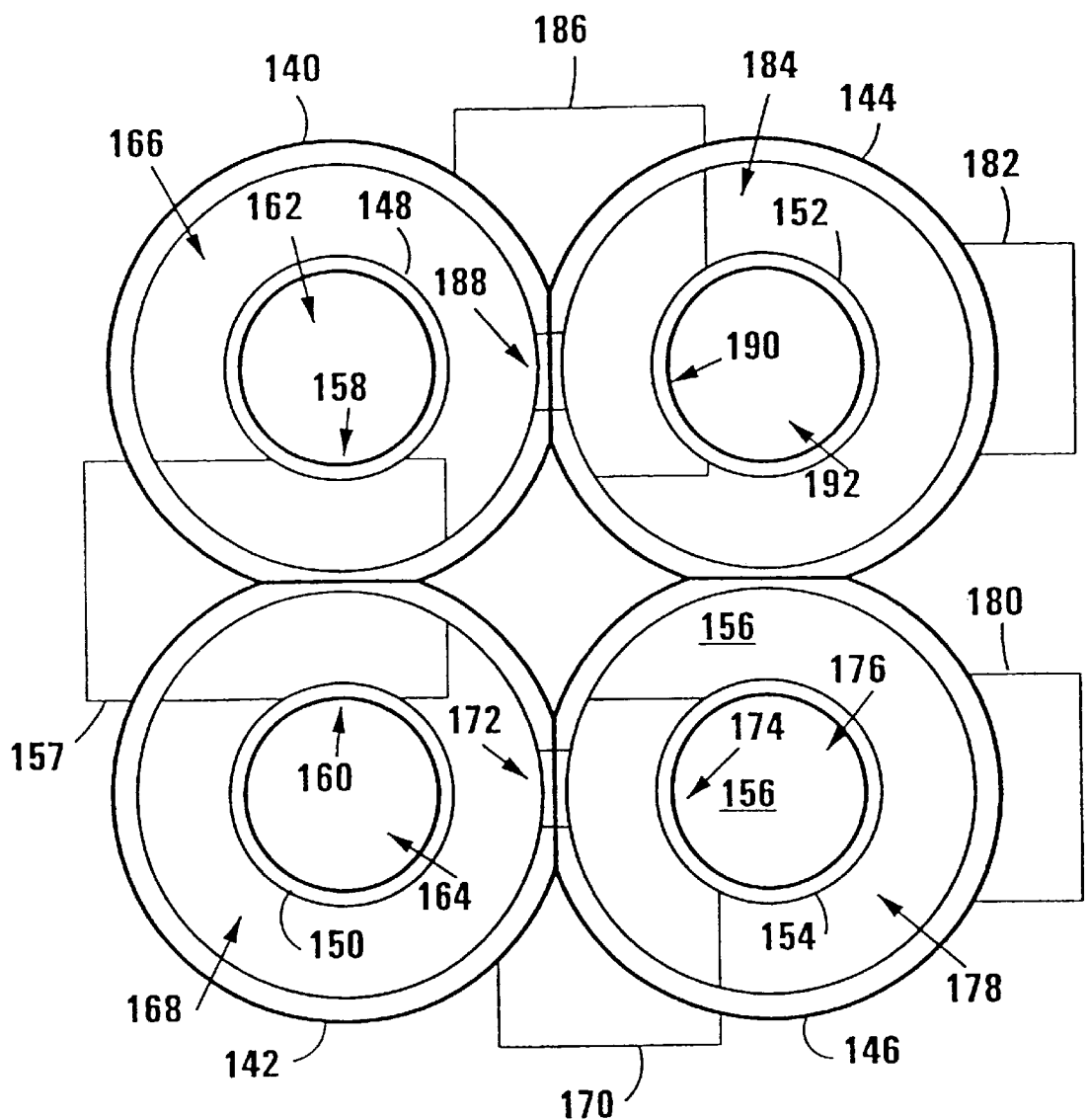
FIG. 6 is a top plan view of a further manifold.

The manifold shown in plan in FIG. 6 is similar to the manifold of FIGS. 4 and 5 and comprises four outer sleeves 140, 142, 144 and 146 and four inner sleeves 148, 150, 152 and 154 all closed at their lower ends by a common base wall 156.

A pipe 157 enters both the sleeves 140 and 142 and is cut away to provide ports at 158 and 160 which place the interior of the pipe 157 in communication with the interiors 162 and 164 of the sleeves 148 and 150. The pipe 157 does not communicate with the annular chambers 166 and 168 which are between the sleeves 140 and 148 and 142 and 150.

A pipe 170 enters the sleeves 142, 146 and is cut away to provide ports at 172 and 174 which place the interior of the pipe 170 in communication respectively with the annular chamber 168 and with the hollow interior 176 of the sleeve 154. There is no communication between the interior of the pipe 170 and the annular chamber 178 which is between the sleeves 146 and 154. It will be noted that the pipe 157 is symmetrically positioned with respect to the sleeves 140 and 142 whereas the pipe 170 is asymmetrically positioned with respect to the sleeves 142 and 146.

A pipe 180 enters the chamber 178 and a pipe 182 enters an annular chamber 184 which is between the sleeves 144 and 152.

A pipe 186, asymmetrically positioned with respect to the sleeves 140 and 144, enters the sleeves 140 and 144 and is cut away to provide ports at 188 and 190 which place its interior in communication with the annular chamber 166 and with the interior 192 of the sleeve 152.

The pipe 157 is equivalent to the pipe 66 and is connected to the pump, the pipe 182 is equivalent to the pipe 68 and is connected to waste, the pipe 180 is equivalent to the pipe 70 and is connected to the pool, the pipe 186 is equivalent to the pipe 72 and is connected to the upper end of the filter and the pipe 170 is equivalent to the pipe 114 and is connected to the outlet of the filter.

Four domes such as are shown in FIG. 5 are fitted onto the sleeves 140, 142, 144 and 146 and four valve closure members (equivalent to members 120) co-operate with the upper ends of the sleeves 148, 150, 152 and 154. Solenoids, equivalent to the solenoids 138, are mounted on the domes. The solenoids control flow from chambers which are bounded by the domes and the diaphragms, equivalent to the diaphragms 118, which close the upper ends of the inner sleeves 140, 142, 144 and 146.

The manifold of FIG. 6 operates in the same manner as the manifold of FIG. 4.

When the valve which is associated with the sleeve 148 open, water flows from the pipe 157, through the port 158 into the interior of the sleeve 148, into the chamber 166 and thence to the pipe 186 and the filter. When the valve associate with the sleeve 150 is open, water flows from the pipe 157, through the port 160 to the interior of the sleeve 150, into the annular chamber 168, through the port 172, into the pipe 170 and then to the outlet of the filter for backwashing purposes.

The valves associated with the sleeves 152 and 154, when opened, respectively permit flow to waste and to the pool. In normal operation the valves associated with the sleeves 148 and 154 are open and the valve associated with the sleeves 150 and 152 are closed. To backwash the valve associated with the sleeve 150 is opened to allow water to reach the pipe 170 and hence the bottom of the filter. The valve associated with the sleeve 152 is open to allow water returning along the pipe 186 to reach the pipe 182. The other two valves are closed. Opening the valves associated with the sleeves 150 and 154 allows water to be pumped through the manifold and back to the pool bypassing the filter.

Abalone is grown in tanks to supplement the depleted resources in the ocean. The body of water in such tanks must be filtered and filters must be cleaned, in the same way that swimming pool water must be cleaned and filtered.

We claim:

1. A unit for connection into pipe work connected to a body of water, the unit comprising a first pipe including an inlet for connection to the pressure side of a pump and an outlet for connection to the inlet of a filter, a first valve in said first pipe, a second pipe having an inlet for connection to the outlet of a filter and an outlet for connection to the body of water, a second valve in said second pipe, a third pipe connecting the first pipe between its inlet and said first valve to the second pipe between its inlet and the second valve, a third valve in said third pipe, a fourth pipe connected to the first pipe between its outlet and the first valve, the fourth pipe having an outlet for connection to waste and there being a fourth valve in said fourth pipe, the first to fourth valves being independently operable to open and close said first to fourth pipes respectively, said unit further comprising a first manifold and a second manifold, said first inlet being constituted by one end of the first manifold and the outlet for connection to waste being constituted by the other end of the first manifold, the first manifold leading from said inlet for connection to a pump to the first valve, from the first valve to the fourth valve and from the fourth valve to said outlet for connection to waste, said outlet for connection to the inlet of a filter branching-off the first manifold between the first and fourth valves, and the second manifold branching-off the first manifold between said inlet for connection to a pump and said first valve, said second manifold leading from the first manifold to the third valve, from the third valve to the second valve, and from the second valve to said outlet for connection to the body of water, the inlet for connection to the outlet of a filter branching-off the second manifold between the second and third valves.

2. A unit as claimed in claim 1 and including a programmable controller for operating said valves.

3. A unit as claimed in claim 1 and including a pressure sensor at the connection between the first and fourth pipes.

4. A unit for connection into pipe work connected to a body of water, the unit comprising a manifold having an inlet for connection to the pressure side of a pump, the inlet communicating with first and second inlet chambers of the manifold which are bounded by first and second peripheral walls each having an upper edge, a first outlet for connection to the body of water so that water can flow from the manifold to the body of water, a second outlet for connection to a drain so that water can flow from the manifold to waste, said outlets respectively communicating with first and second outlet chambers which are respectively bounded by third and fourth peripheral walls each having an upper edge, first and second ports which serve both as inlets and outlets and are respectively for connection to the inlet of a filter and to the outlet of a filter, said first port communicating with two chambers, one of these chambers being bounded by said first peripheral wall and the other of these chambers by said fourth peripheral wall, there being an additional chamber bounded by said second and third peripheral walls, said second port communicating with this additional chamber.

5. The combination of a unit as claimed in claim 4 and a cover, there being a diaphragm between the cover and the manifold, said diaphragm bearing on said peripheral walls to form four valves, each of said first and second inlet chambers, said other chamber and said additional chamber being connected by bleed passages passing through the diaphragm to respective compartments above the diaphragm, there being an outlet passage from each compartment and valve means in each outlet passage for allowing flow from each compartment thereby to drop the pressure therein when the respective valve means is open, and means for controlling said valve means independently of one another.

6. The combination of claim 5 and which includes a spring in each compartment for pressing the diaphragm against the respective peripheral wall.

7. A unit as claimed in claim 4 and which comprises first, second, third and fourth outer sleeves and first, second, third and fourth sleeves, each inner sleeve being co-axial with a respective outer sleeve, said inlet chambers being constituted by the interiors of the first and second inner sleeves, said first and second outlet chambers being respectively between the third inner sleeve and the third outer sleeve and the fourth inner sleeve and the fourth outer sleeve, said one chamber being between said first inner sleeve and said first outer sleeve, said other chamber being within said fourth inner sleeve, and said additional chamber being constituted by the interior of said third inner sleeve and the annular space between the second inner sleeve and second outer sleeve.

8. The combination of a unit as claimed in claim 7 and four diaphragms which bear on the upper ends of said inner sleeves to form four valves, the interior of each inner sleeve being connected by a bleed passage passing through the respective diaphragm to a respective compartment above the diaphragm, there being an outlet passage from each compartment and valve means in each outlet passage for allowing flow from each compartment thereby to drop the pressure therein when the respective valve is to be opened, and means for controlling said valve means independently of one another.

9. The combination of claim 8 and including a spring in each compartment for pressing each diaphragm against each inner sleeve upper edge.

\* \* \* \* \*